J. G. JONES.
PROCESS OF BURNING LIME.
APPLICATION FILED JAN. 27, 1911.
1,011,804.
Patented Dec. 12, 1911.
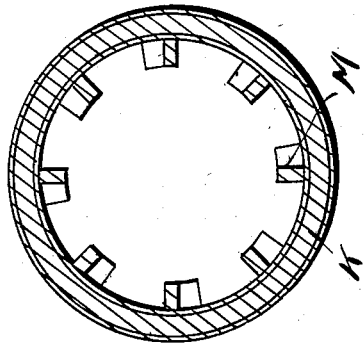
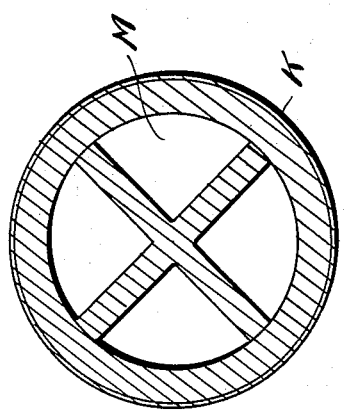
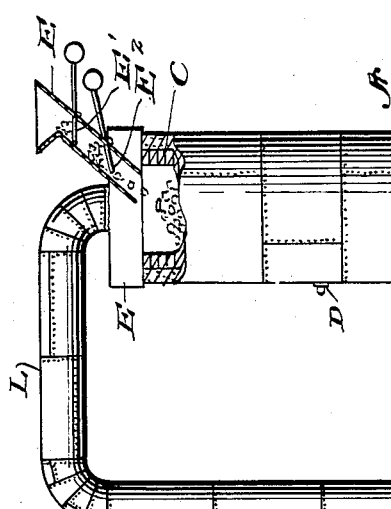
Inventor
J. G. Jones

UNITED STATES PATENT OFFICE.

JOHN G. JONES, OF CARTHAGE, NEW YORK.

PROCESS OF BURNING LIME.

1,011,804.     Specification of Letters Patent.    Patented Dec. 12, 1911.

Application filed January 27, 1911. Serial No. 605,102.

*To all whom it may concern:*

Be it known that I, JOHN G. JONES, a citizen of the United States, residing at Carthage, in the county of Jefferson and State of New York, have invented certain new and useful Improvements in Processes of Burning Lime; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful processes of burning lime by the combined use of a vertically disposed stationary and a rotatable kiln in connection with a gas producer, the object of the invention being to utilize the waste heat from the rotary kiln to partially disassociate the $CO_2$ gas from the limestone before entering the rotary kiln, thereby converting the entire length of the rotary kiln into a burning zone for removing the balance of the $CO_2$ gas, and reducing the lime to an oxid state.

The invention consists further in the process of burning lime by the employment of combination stationary and rotary kilns, in connection with a gas producer, and by the admixture of a quantity of limestone with the fuel of the gas producer, whereby a long and slow burning flame may be produced, the limestone thus admitted, being reduced by heat from its carbonate to an oxid state, and giving off carbonic acid gas which mixes with the producer gas, the oxid of lime within the gas producer, becoming slaked as it reaches the water with which the producer is sealed, and thus having a tendency to keep the cinder from slagging, and causing the producer to work more easily and better in every way than without presence of the limestone mixed with the fuel.

Another and an important object of the invention, consists in the method of forming lime by the use of combination kilns and gas producer, or other heat producing material, wherein the dust formed by the lime passing through the rotary kiln, may be gathered up in a vertical kiln and retained by the particles of limestone therein, thus avoiding the use of the large and expensive dust chambers.

Still another and important feature of the present invention resides in the provision of partitions, formed longitudinally through the kiln, and designed to divide up the material as it passes through the kiln, and offering a greater radiating surface against which the lime contacts as it passes through the kiln.

A combined apparatus which may be employed in carrying out the steps of my process, I have illustrated in the accompanying drawings in which—

Figure 1 is a vertical sectional view through a combination vertically and horizontally disposed kiln. Fig. 2 is a sectional view on line 2—2, of Fig. 1 and Fig. 3 is a sectional view on line 3, 3, of Fig. 1.

Reference now being had to the details of the drawings by letter A designates a vertically disposed stationary kiln mounted upon a suitable foundation B, said kiln having preferably a steel shell with a fire brick lining C and provided, at intervals with openings D forming means whereby instruments may be inserted for the purpose of breaking down any arches which may form within the kiln, and $D^2$ is a pyrometer employed for the purpose of indicating the temperature of the heat of the kiln. The upper end of the stationary kiln has a hopper E of special design, and so arranged that the draft upon the kiln will not be affected by the discharge of the limestone therein. Within said hopper are the two balanced partitions, designated respectively by letters $E'$ and $E^2$, the limestone being adapted to be fed to the hopper in any suitable manner not shown.

The lower portion of the vertical kiln, adjacent to its exit end, is contracted and disposed at an inclination, and communicates with a laterally extending shell G about which one end of the kiln K rotates, a suitable ring $K'$ fixed to the shell $G'$, serves to close the space intervening between the shell and rotary kiln. The rotary kiln is mounted upon antifriction rollers, and may be driven in any suitable manner, and at such a speed as may be found necessary to produce the best results.

In the present instance I have shown a gas producer H as a suitable means for producing heat to the kiln, although of course any heat producing means may be employed if desired, and leading from the gas producer is a pipe $H'$ which communicates with the vertical stack $H^2$, which serves as a connection for the purpose of conducting gas from the producer to the kiln, while the bottom of said stack serves as a chamber for the collection of soot from the gas and which stack communicates, through the passageway $H^3$ with the chamber $H^4$ in an opening in which, one end of the rotary kiln is disposed. By this arrangement it will be noted that a free passageway will be afforded from the gas producer through the two kilns.

Opening into the lower contracted portion of the upright stationary kiln, is casing I in which a reciprocable feed plunger $I'$ is mounted, the latter being pivotally connected with a pitman J, which in turn is pivotally connected to a pin $J'$ mounted eccentrically upon the disk $J^2$, fixed to the shaft $J^3$, and which may be driven in any suitable manner, and at such a speed as may be desired to cause the limestone to be delivered to the rotary kiln in proper quantities.

Leading from the sealed top of the stationary kiln is a pipe L communicating with the fan casing $L'$ and from which latter a pipe $L^2$ leads through which the gases drawn from the kilns, may escape. By the provision of the fan, it will be observed that the draft upon the kilns may be regulated to a nicety, and the heat acting upon the lime being burned easily regulated.

By reference to the cross-sectional view through the rotary kiln, it will be noted that the latter is provided with interior partitions, which intersect each other, and divide the kiln into a series of compartments, the partitions being designated by letter M. These partitions are provided, so that the material as it is fed by a worm feed $M'$ into the various compartments will be subjected to a much greater heating surface than would be the case were it not for the partitions. As the limestone enters the rotary kiln it will be partially disassociated from its $CO_2$ gas, and by the rotary movement of the kiln at an inclination, the lime will be fed forward gradually, being subjected to the action of the flame and enabling same to be thoroughly and uniformly reduced to an oxid state.

Positioned about the lower portion of the vertical kiln are the pipes Q which lead through the wall of the kiln and are provided for the purpose of admitting steam, into the vertical kiln to commingle with the particles of limestone, and which will serve to prevent the particles from sticking together or to the wall of the kiln, and which steam will also assist in the process of disassociating the $CO_2$ gas from the limestone before it enters the rotary kiln.

In operation, the rotary kiln being pitched at a proper angle and the parts adjusted as shown with the vertical kiln filled with limestone, which may be in pieces of any size, either fine or coarse, the producer gas or other heat producing material, is ignited and, by means of a natural or mechanical draft, the flame therefrom will be drawn therefrom through the horizontal kiln and up and among the particles of limestone within the vertical kiln. By the admixture of a certain percentage of limestone with the fuel in the gas producer, carbon dioxid gas is formed, and a slow burning long flame will be produced, and as the limestone, which is mixed with the fuel is converted by the heat from its carbonate, to an oxid state, the $CO_2$ gas will be given off and the oxid of lime within the fuel, as it reaches the water, will slake and have a tendency to keep the cinder from slagging, thus causing the gas producer to work more satisfactorily than would be the case without the addition of the limestone to the fuel. The effect of the $CO_2$ gas given off from the limestone, will mingle with the producer gas and produce a long and slow burning flame within the rotary kiln. When the temperature within the vertical kiln has registered sufficiently high, which may be determined with the use of a pyrometer at any proper location therein, the rotary kiln is put in motion, and a certain quantity of limestone will be fed therein from the vertical kiln and be moved forward into the burning zone of the rotary kiln. The limestone in the vertical kiln will follow down to replace the amount, which will be fed by a variable movement of the plunger. By the use of the horizontal kiln of a considerable diameter divided into compartments, the length of the kiln may be appreciably shortened, and by so doing the flame from the gas producer may be carried immediately through the rotary kiln, imparting its heat to the lime in the several compartments, and up into the vertical kiln, bringing the limestone within the latter practically to a point of disassociation of its $CO_2$ gas before the limestone enters the rotary kiln. By this method it will be noted that the entire length of the kiln will constitue a burning zone wherein the lime will be converted during its passage therethrough into an oxid state.

It will be noted that the dust formed within the rotary kiln will pass through into the vertical kiln and be retained therein among the particles of limestone and thus avoiding the use of specially constructed and expensive dust-chambers. The waste gases as they pass through and out the upper end of the vertical kiln, will have given up their heat to the incoming limestone so that, as they make exit to the atmosphere, they will be practically cold, thus doing away with expensive waste heat steam boilers.

In burning lime by my improved method, as herein described, I have found that the particles of limestone of large and small sizes may be burned with equally good results, and not only is the process economical of fuel, but in cost of installation, and effecting a considerable saving of labor.

What I claim to be new is,

1. A process of burning lime consisting of first passing the limestone through a vertical kiln, and subjecting the same in its carbonate state to the action of heat to substantially the point of disassociation from the limestone of its $CO_2$ gas, thence causing the limestone to pass through a rotary kiln, wherein it is reduced by heat to an oxid state.

2. A process of burning lime consisting of first passing the limestone through a vertical kiln and subjecting same, in its carbonate state, to the action of heat to substantially the point of disassociation from the limestone of its $CO_2$ gas, the introduction of steam within the vertical kiln o commingle with the limestone therein, and afterward causing the limestone to pass through a rotary kiln where it is reduced by heat, to an oxid state.

3. A process of burning lime consisting in the subjecting of the particles of limestone substantially disassociated from its $CO_2$ gas, to heat within a rotary kiln; and thus converting the limestone into an oxid state, of conducting the heat and dust generated within the rotary kiln into a vertical kiln containing particles of limestone in which the dust is gathered and retained by the limestone.

In testimony whereof I hereunto affixed my signature in the presence of two witnesses.

JOHN G. JONES.

Witnesses:
 H. L. JONES,
 M. L. JONES.